United States Patent
Viroli et al.

(10) Patent No.: US 11,662,100 B2
(45) Date of Patent: May 30, 2023

(54) INDUCTION COOKING HOB WITH INTEGRATED DOWN-DRAFT HOOD

(71) Applicant: ELECTROLUX APPLIANCES AKTIEBOLAG, Stockholm (SE)

(72) Inventors: Alex Viroli, Forli (IT); Nicola Terracciano, Ruvo di Ruglia (IT); Laurent Jeanneteau, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 567 days.

(21) Appl. No.: 16/607,396

(22) PCT Filed: Apr. 10, 2018

(86) PCT No.: PCT/EP2018/059120
§ 371 (c)(1),
(2) Date: Oct. 23, 2019

(87) PCT Pub. No.: WO2018/197199
PCT Pub. Date: Nov. 1, 2018

(65) Prior Publication Data
US 2020/0132310 A1    Apr. 30, 2020

(30) Foreign Application Priority Data

Apr. 26, 2017 (EP) .................................... 17168159

(51) Int. Cl.
*F24C 15/20* (2006.01)
*H05B 6/12* (2006.01)

(52) U.S. Cl.
CPC ....... *F24C 15/2042* (2013.01); *H05B 6/1209* (2013.01)

(58) Field of Classification Search
CPC .. F24C 15/2042; F24C 15/20; F24C 15/2021; H05B 6/1209; H05B 6/12; H05B 6/1263
See application file for complete search history.

(56) References Cited

U.S. PATENT DOCUMENTS

| | | | |
|---|---|---|---|
| 4,191,875 A | * | 3/1980 | Cunningham ........ F24C 15/101 336/60 |
| 4,431,892 A | | 2/1984 | White |

(Continued)

FOREIGN PATENT DOCUMENTS

| | | |
|---|---|---|
| DE | 3741721 A1 | 6/1988 |
| DE | 102012210844 A1 | 2/2013 |

(Continued)

OTHER PUBLICATIONS

International Search Report and Written Opinion in PCT/EP2018/059120 dated Jun. 25, 2018, 13 pages.

(Continued)

*Primary Examiner* — Jorge A Pereiro
(74) *Attorney, Agent, or Firm* — Pearne & Gordon LLP

(57) ABSTRACT

The present invention relates to an induction cooking hob (10) with an integrated down-draft hood. The down-draft hood includes at least one downstream channel (40) extending from an air inlet (18) to an air outlet (36). The air inlet (18) is arranged within and/or beside a cooking panel (12) of the induction cooking hob (10). The air outlet (36) is arranged in a bottom wall and/or side wall of a chassis of the induction cooking hob (10). At least one heat sink (28) is arranged in and/or at the down-stream channel (40). The heat sink (28) is thermally connected to at least one power circuit for at least one induction generator. The heat sink (28) provides a heat exchange between the power circuit and an air stream through the downstream channel (40), so that the power circuit is cooled down.

16 Claims, 1 Drawing Sheet

(56) References Cited

U.S. PATENT DOCUMENTS

| | | | |
|---|---|---|---|
| 4,490,596 A * | 12/1984 | Hirai | H05B 6/062 |
| | | | 165/59 |
| 4,665,893 A | 5/1987 | Miyagawa et al. | |
| 5,428,207 A * | 6/1995 | Essig | H05B 6/1281 |
| | | | 219/622 |
| 5,430,273 A * | 7/1995 | Bogdanski | H05B 6/062 |
| | | | 336/222 |
| 5,446,268 A * | 8/1995 | Chen | F24C 15/101 |
| | | | 219/623 |
| 6,455,818 B1 * | 9/2002 | Arntz | F24C 15/2042 |
| | | | 126/299 R |
| 10,006,641 B2 * | 6/2018 | Bruckbauer | F24C 15/2035 |
| 2008/0185376 A1 * | 8/2008 | Gagas | H05B 6/1263 |
| | | | 219/623 |
| 2010/0163549 A1 * | 7/2010 | Gagas | F24C 15/2042 |
| | | | 219/622 |
| 2012/0152226 A1 * | 6/2012 | Oagley | F24C 15/20 |
| | | | 165/185 |
| 2012/0152933 A1 * | 6/2012 | Matsui | H05B 6/1263 |
| | | | 219/623 |
| 2012/0305544 A1 * | 12/2012 | Oagley | H05B 6/1263 |
| | | | 219/622 |
| 2013/0340742 A1 * | 12/2013 | Sosso | F24C 15/2042 |
| | | | 126/299 D |
| 2014/0230662 A1 * | 8/2014 | Siegel | F24C 15/2021 |
| | | | 99/344 |
| 2018/0209662 A1 * | 7/2018 | Adam | F24C 15/2042 |
| 2018/0229171 A1 * | 8/2018 | Adam | B01D 46/0031 |
| 2018/0306449 A1 * | 10/2018 | Flesch | F24C 15/2042 |
| 2019/0032925 A1 * | 1/2019 | Gargiulo | F24C 15/2071 |

FOREIGN PATENT DOCUMENTS

| | | |
|---|---|---|
| JP | 2004179056 A * | 6/2004 |
| JP | 3860109 | 12/2006 |

OTHER PUBLICATIONS

European Notice of Grant for application No. 17168159.6, dated Dec. 23, 2022, 26 pages.

* cited by examiner

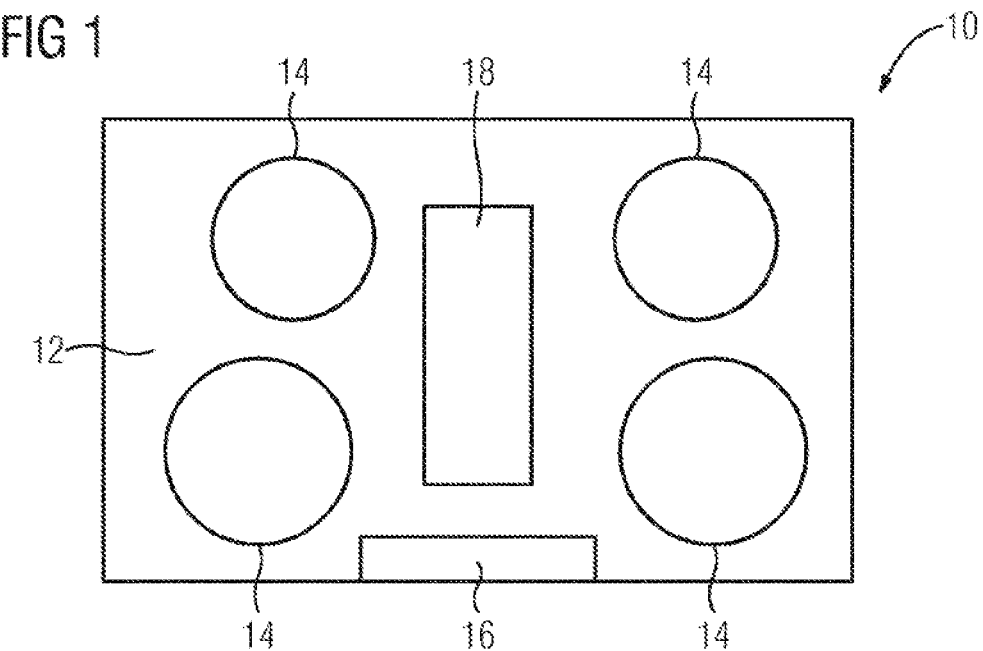
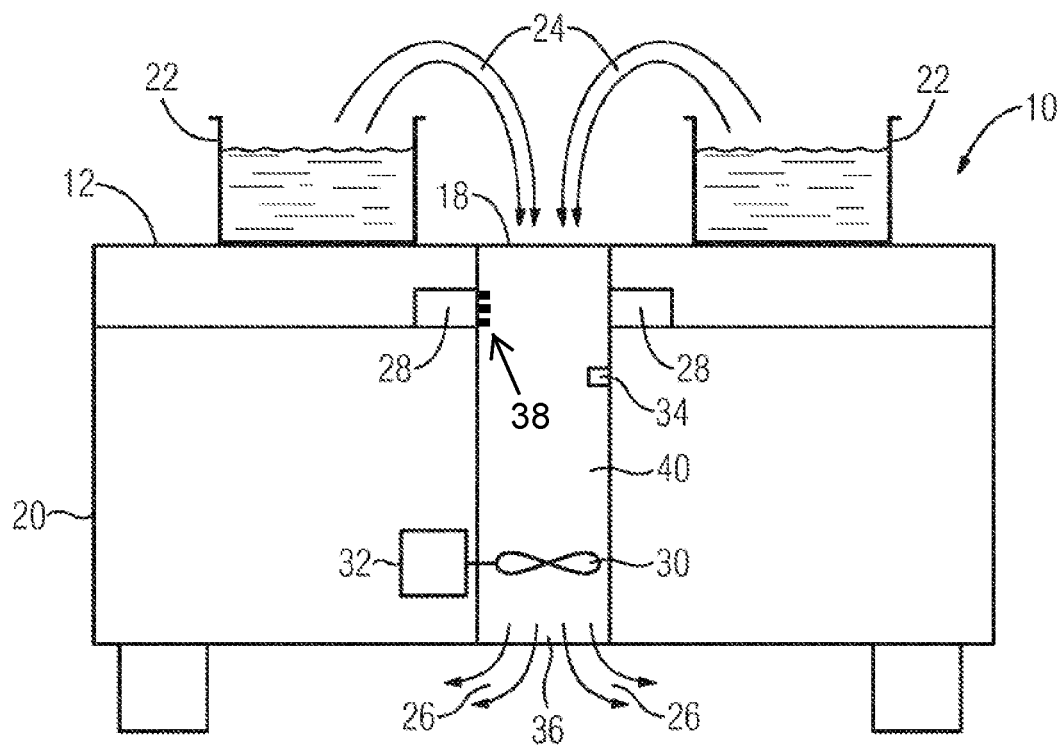

INDUCTION COOKING HOB WITH INTEGRATED DOWN-DRAFT HOOD

The present invention relates to an induction cooking hob with an integrated down-draft hood.

An induction cooking hob with an integrated down-draft hood is currently available on the market. The down-draft hood requires a fan for sucking air and steam. Further, the power circuits of the induction cooking hob have to be cooled. The sucking of air and the cooling of the power circuits require fans or similar devices.

It is an object of the present invention to provide an induction cooking hob with an integrated hood, wherein the sucking of air through the hood and the cooling of the power circuits can be efficiently performed.

According to the present invention an induction cooking hob with an integrated down-draft hood is provided, wherein:
- the down-draft hood includes at least one downstream channel extending from an air inlet to an air outlet,
- the air inlet is arranged within and/or beside a cooking panel of the induction cooking hob,
- the air outlet is arranged in a bottom wall and/or side wall of a chassis of the induction cooking hob, at least one heat sink is arranged in and/or at the downstream channel,
- the heat sink is thermally connected to at least one power circuit for at least one induction generator, and
- the heat sink provides a heat exchange between the power circuit and an air stream through the downstream channel, so that the power circuit is cooled down.

The core of the present invention is that the heat sink is thermally connected to the power circuit for the induction generator on the one hand and said heat sink is arranged in and/or at the downstream channel of the integrated down-draft hood on the other hand. This allows an efficient operation of the proper induction cooking hob and the integrated down-draft hood.

Preferably, the down-draft hood includes at least one fan for sucking the air stream through the downstream channel.

Further, the down-draft hood may include at least one control unit for controlling the fan, in particular the speed of the fan.

Moreover, the induction cooking hob may include a temperature sensor for detecting the temperature of the power circuit.

Advantageously, the speed of the fan may depend on the temperature of the power circuit.

Additionally, the speed of the fan may depend on the power setting of the power circuit.

Furthermore, the down-draft hood may include at least one air quality sensor for detecting contaminations of the air stream through the downstream channel.

Preferably, the air quality sensor is connected or connectable to the control unit for controlling the fan.

In particular, the heat sink includes a plurality of cooling ribs extending at least partially into the downstream channel.

For example, the air inlet of the downstream channel is arranged in a centre of the cooking panel.

Further, the down-draft hood may include at least one condenser for extracting humidity from the air stream through the downstream channel.

Moreover, the down-draft hood may include at least one filter arranged in the downstream channel.

For example, the downstream channel is arranged vertically, wherein preferably the air outlet is arranged in the bottom of the chassis of the induction cooking hob.

In particular, the heat sink is arranged in an upper portion of the downstream channel.

Novel and inventive features of the present invention are set forth in the appended claims.

The present invention will be described in further detail with reference to the drawing, in which FIG. 1 illustrates a schematic top view of an induction cooking hob with an integrated down-draft hood according to a preferred embodiment of the present invention, and FIG. 2 illustrates a schematic sectional front view of the induction cooking hob with the integrated down-draft hood according to the preferred embodiment of the present invention.

FIG. 1 illustrates a schematic top view of an induction cooking hob 10 with an integrated down-draft hood according to a preferred embodiment of the present invention.

The induction cooking hob 10 comprises a cooking panel 12 including a number of cooking zones 14. In this example, the cooking panel 12 includes four cooking zones 14. Further, the induction cooking hob 10 comprises a user interface 16 arranged on the cooking panel 12. In general, the user interface 16 may be arranged in an arbitrary place at or on the induction cooking hob 10.

An air inlet 18 of the down-draft hood is arranged in the centre of the cooking panel 12. In this example, the air inlet 18 has a rectangular shape. The cooking zones 14 are arranged beside the air inlet 18.

FIG. 2 illustrates a schematic sectional front view of the induction cooking hob 10 with the integrated down-draft hood according to the preferred embodiment of the present invention.

The induction cooking hob 10 comprises a chassis 20. The induction cooking hob 10 may be a freestanding cooking appliance. The cooking panel 12 forms the top side of the induction cooking hob 10. In this example, two cooking pots 22 are arranged on the cooking panel 12.

The down-draft hood includes an air inlet 18 and an air outlet 36. The air inlet 18 is arranged in the centre of the cooking panel 12, while the air outlet 36 is formed in the bottom of the chassis 20. The air outlet 36 is arranged beneath the air inlet 18, so that a vertical downstream channel 40 is formed inside the down-draft hood. Steam 24 from the cooking pot 22 enters the downstream channel 40 through the air inlet 18. Air leaves the downstream channel 40 through the air outlet 36. For example, one or more filters are arranged in the downstream channel. Further, condensers may be arranged in the downstream channel 40 in order to condensing the steam.

The down-draft hood includes a fan 30 arranged in the lower part of the downstream channel 40. The fan 30 is controlled by a control unit 32. The control unit 32 is provided for controlling the speed of the fan 30. The fan 30 sucks air and steam top down through the downstream channel 40. Further, the down-draft hood includes at least one air quality sensor 34 arranged in the downstream channel 40. The air quality sensor 34 is adapted for detecting contaminations of the air in the downstream channel 40. The speed of the fan 30 depends on signals detected by the air quality sensor 34. For example, the speed of the fan 30 increases automatically, if the air quality sensor 34 detects a high level of air pollution.

The induction cooking hob 10 comprises at least one heat sink 28 arranged in the upper part of the downstream channel 40. The heat sink 28 is mechanically and thermally connected to power circuits for the induction generators of the cooking zones 14. The heat sink 28 allows a heat exchange between the power circuits and an air stream through the downstream channel 40. The power circuits are cooled down, while the air stream is heated up. For example, the heat sink 28 includes a plurality of cooling ribs 38 extending into the downstream channel 40. Preferably, the power circuits are sealed in such a way that humidity cannot reach the electric and electronic components of the power circuits.

The induction cooking hob 10 with the integrated down-draft hood according to the present invention allows cooling down the power circuits for the induction generators of the cooking zones 14 by the air stream through said down-draft hood.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 induction cooking hob
12 cooking panel
14 cooking zone
16 user interface
18 air inlet
20 chassis
22 cooking pot
24 steam from cooking pot
26 steam
28 heat sink
30 fan
32 control unit
34 air quality sensor
36 air outlet
40 downstream channel

The invention claimed is:

1. An induction cooking hob with an integrated down-draft hood, wherein:
the down-draft hood includes a vertically oriented downstream channel extending linearly from an air inlet to an air outlet,
the air inlet is arranged within and/or beside a cooking panel of the induction cooking hob and faces a space above the cooking hob where cooking fumes emanate from cooking utensils in-use,
the air outlet is arranged in a bottom wall of a chassis of the induction cooking hob,
a heat sink is arranged in and/or at the downstream channel,
the heat sink is thermally connected to a power circuit for an induction generator,
the heat sink provides a heat exchange between the power circuit and an air stream through the downstream channel adapted to cool the power circuit, and
a fan is arranged within the downstream channel and is configured to draw the air stream through the downstream channel, the fan being positioned fluidly downstream from the heat sink.

2. The induction cooking hob according to claim 1, wherein the down-draft hood includes a control unit for controlling the fan.

3. The induction cooking hob according to claim 2, a speed of the fan depends on a temperature of the power circuit.

4. The induction cooking hob according to claim 2, wherein a speed of the fan depends on a power setting of the power circuit.

5. The induction cooking hob according to claim 1, wherein the induction cooking hob includes a temperature sensor for detecting the temperature of the power circuit.

6. The induction cooking hob according to claim 1, wherein the down-draft hood includes an air quality sensor for detecting contaminations of the air stream through the downstream channel.

7. The induction cooking hob according to claim 6, wherein the air quality sensor is connected or connectable to a control unit for controlling the fan.

8. The induction cooking hob according to claim 1, wherein the heat sink includes a plurality of cooling ribs extending at least partially into the downstream channel.

9. The induction cooking hob according to claim 1, wherein the air inlet of the downstream channel is arranged in a centre of the cooking panel.

10. The induction cooking hob according to claim 1, wherein the down-draft hood includes a condenser for extracting humidity from the air stream through the downstream channel.

11. The induction cooking hob according to claim 1, wherein the down-draft hood includes a filter arranged in the downstream channel.

12. The induction cooking hob according to claim 1, wherein the heat sink is arranged in an upper portion of the downstream channel.

13. The induction cooking hob according to claim 1, wherein the power circuit is sealed from humidity.

14. A cooking appliance comprising an induction cooking hob having a cooking panel adapted to support a cooking utensil thereon in an induction cooking zone thereof, a downdraft comprising an air inlet arranged in said cooking panel adjacent to said cooking zone and facing a space above the cooking hob where cooking fumes emanate from the cooking utensil in-use, a vertically oriented channel extending linearly downward from said air inlet to an air outlet located below said air inlet, a fan for drawing air above said cooking panel through said air inlet and through said channel so that the air is exhausted from said air outlet, a heat sink thermally connected to a power circuit for an induction generator of said cooking zone, said fan being positioned fluidly downstream from said heat sink, said heat sink comprising a cooling rib that extends into said channel such that air passing therethrough draws thermal energy from said rib thereby effectively drawing thermal energy from said power circuit to thereby cool said power circuit, and a controller for controlling a speed of said fan and a temperature sensor for detecting a temperature of said power circuit, said controller being adapted to control the speed of said fan at least partly in response to the temperature of said power circuit.

15. The cooking appliance according to claim 14, said heat sink being mechanically connected to said power circuit, the appliance further comprising an air quality sensor arranged in said channel and adapted to detect a level of pollutants in the air flowing therethrough, said controller further controlling the speed of said fan partly in response to a detected level of pollutants in the air flowing through said channel.

16. The cooking appliance according to claim 14, wherein the power circuit is sealed from humidity.

\* \* \* \* \*